United States Patent [19]
Hogan

[11] 4,029,037
[45] June 14, 1977

[54] PROCESS FOR REINFORCING PLASTIC MATERIAL AND PRODUCTS THEREFROM

[75] Inventor: Brian Patrick Hogan, Milton Keynes, England

[73] Assignee: Aquatech Composite Materials Limited, United Kingdom

[22] Filed: Sept. 16, 1975

[21] Appl. No.: 613,920

[30] Foreign Application Priority Data

Sept. 18, 1974 United Kingdom ............. 40748/74

[52] U.S. Cl. .............................. 114/127; 428/107; 428/114; 428/294; 428/303; 428/315; 428/313; 264/45.5; 264/46.5; 264/46.7; 264/231; 264/259; 264/261

[51] Int. Cl.² ..................... B63B 3/38; B32B 5/12

[58] Field of Search ............ 9/310 E; 114/127, 140; 428/114, 107, 294, 292, 303, 315, 313

[56] References Cited

UNITED STATES PATENTS

| | | | |
|---|---|---|---|
| 3,221,869 | 12/1965 | Paasche | 428/114 |
| 3,313,674 | 4/1967 | Mathews | 428/294 |
| 3,647,308 | 3/1972 | Enlow et al. | 428/313 |
| 3,697,126 | 10/1972 | Tiffin et al. | 428/315 |
| 3,747,550 | 7/1973 | Stoeberl | 114/140 |
| 3,756,905 | 9/1973 | Mills et al. | 428/114 |
| 3,791,912 | 2/1974 | Allard | 428/114 |

*Primary Examiner*—George F. Lesmes
*Assistant Examiner*—William R. Dixon, Jr.
*Attorney, Agent, or Firm*—Kenway & Jenney

[57] ABSTRACT

A plastics structure, such as the center-board for a sailing boat or a vehicle body panel, comprises a foamed plastics material containing arrays of high tensile steel reinforcing wires having a diameter in the range 0.040 to 0.125 inches and a yield strength of not less than 200,000 psi, located in the surface layers thereof at a distance of not less than 0.06 inches below the surface, to yield a structure having improved impact resistance and enhanced rigidity. The wires may be preformed plastic spacer elements or on a plastic sheet material which then forms the outer surface skin of the structure. Polyurethane is the preferred plastics material. Additional layers of reinforcing wires may be included if required and it is preferred that all wire be pretreated by e.g. shot blasting to improve adherence to the plastics material.

11 Claims, 4 Drawing Figures

PROCESS FOR REINFORCING PLASTIC MATERIAL AND PRODUCTS THEREFROM

The present invention relates to a method of reinforcing foam plastic articles with high tensile steel and to products manufactured therefrom.

It is often a requirement that a structure, for example a component of a motor vehicle or a sailing boat, should behave in an elastic manner under the loads imposed by normal usage, and in a plastic manner when subjected to severe overloads. An example is the behaviour required from a motor car body panel. In normal use, such a panel must retain its shape, i.e. it must be rigid, and in an abnormal situation, such as a collision, it is required to absorb energy. Such components manufactured from unreinforced plastic materials are frequently excessively flexible and tend to shatter under impact or to deform without absorbing a significant amount of energy.

We have now found that the incorporation of high tensile steel elements, such as wire, into the surface of a foamed plastic material produces a structure with a reduced tendency to disintegrate on impact, improved rigidity is also obtained when such elements are present in two opposite surfaces of the structure.

Accordingly, therefore, the present invention provides a rigid plastics structure comprising a foamed plastics material containing a surface layer thereof at least one array of parallel spaced high tensile steel reinforcing elements to which the foamed plastics material adheres, the said surface layer having a smooth outer surface and the high tensile steel reinforcing elements being aligned substantially parallel to the said outer surface.

A surface layer is that portion of the structure immediately adjacent to and including a surface and is of sufficient thickness to enclose at least one array of high tensile steel reinforcing elements.

By a smooth outer surface is meant a surface free of cavities or indentations produced during the foaming of a plastics material. Such a surface may be obtained using a self-skinning plastics material.

In thin structures, e.g. body panels, two opposite surface layers may, when viewing the structure in cross-section, overlap and in such structures the array of reinforcing elements will normally be equidistant between the two opposite surfaces i.e. in the neutral axis of the structure.

The high tensile steel elements should have a yield strength of not less than 200,000 psi and are preferably in the form of wire the diameter of which may conveniently be in the range 0.040 to 0.125 inches. Preferably the surface of the elements is etched or otherwise treated, e.g. by shot blasting or chemical treatment, to ensure a good bond with the plastics material.

The layer of high tensile steel elements must be covered by a layer of plastic of sufficient depth to ensure that the elements do not corrode if the surface of the structure is scratched. Preferably, therefore, the elements should be located in the surface layer at a depth of not less than 0.06 inches below the outermost surface of the structure.

Normally, the structure will have two opposite smooth surfaces both containing high tensile steel reinforcing elements. If desired additional layers of reinforcing elements may be included in the structure preferably in parallel planes although, depending on the properties required in the structure, the elements of one layer may be at an angle, for example a right angle, to the elements in another parallel plane.

If desired reinforcing elements may be included in the structure other than in the surface layers thereof.

The plastics material may be of any suitable type, preferably it will be a self-skinning material such as polyurethane, polyamide or polyolefin.

The outer surface layer of the structure, that is the layer above the reinforcing elements, may be of a different plastics material to the remainder of the structure provided that a very strong bond is formed between the different plastics materials.

The combination of the properties of the high tensile steel reinforcing elements and the foamed plastics material can be employed to obtain structures having a wide range of useful properties. This range of properties is achieved by varying the content of the high tensile steel elements and the bond strength between the elements and plastics material. Thus it may be desirable to design a structure to fail under overload conditions in a specific manner. This may be accomplished by varying the ratio of reinforcing element surface area to cross-sectional area, e.g. by selecting wire elements having suitable diameters so that failure occurs in the tension members by fracture of the metal without breakdown of the metal-plastics bond or by breakdown of the metal-plastics bond without fracture of the metal. In the first instance, the reinforcing element and plastic will break and the failed structure will hinge about the compression members; in the second instance after the bond has broken the structure will take on a permanent bond. A third mode of failure is possibly by reducing the spacing between the elements to point where failure occurs by buckling of the compression members associated with the fracture of the foam plastic in the plane of the reinforcing sheet. In this instance after failure the component will hinge about the tension members.

Thus the present invention when applied in the manufacture of structures being component parts of automobile bodies, enables such components to be designed to control the intrusion of the components from a side impact or to collapse in a controlled manner on being subjected to head-on impact.

The present invention also has particular application in the manufacture of components used on sailing boats, and which have traditionally been made of wood, for example, the centre board and rudder. Such products may be produced in steel reinforced, self-skinning polyurethane foam to give a finished product which has physical properties virtually identical to those of the traditional wooden component. These components, i.e. the centre board and rudder, are subject to high stress in normal operation and they are required to retain their shape under these conditions and also to undergo severe overload without taking on a permanent deformation. Furthermore, these components must also resist the bending movement caused by thermal expansion when one side is laid on wet sand whereas the other side is exposed to heat and sun. To meet these requirements, the components must be designed to have a high rigidity.

High rigidity is obtained by placing high tensile steel wires lengthways of the article in a parallel arrangement and close to the surface thereof. The amount of steel necessary to give the required rigidity can be calculated using known methods. The number of strands and the diameter of the wire may also be calculated from the bond strength between the wire and the plastic and the design value of the maximum loading.

The present invention also includes a process for the manufacture of a rigid plastics structure comprising positioning a parallel array of high tensile steel elements in a mould at a predetermined distance from one inner surface thereof, introducing a plastics materials into the mould and subsequently or simultaneously introducing a blowing agent and foaming and curing the plastics material to yield the desired structure.

When two opposite sides of a structure are reinforced the location of the two arrays of reinforcing elements is critical; they must be positioned symetrically about the neutral axis to avoid distortion resulting from differential contraction after foaming and curing. Conveniently the reinforcing elements may be formed into an array having the correct inter-element spacing by locating the elements in a series of parallel supports, for example plastic strips containing spaced clip portions to retain the said elements. The supports may also incorporate spacers to position the array of elements at the correct distance from the inner wall of the mould. The two arrays may be positioned relative to each other by means of U-shaped members, the arms of the U locating on a support in each array. The U-shaped members may be formed of a spring steel or resilient plastics material.

Alternatively the elements may be bonded in straight lengths on cross members or plastic sheets to produce flat sheets of reinforcements which may then be positioned in the mould by members, preferably spring members, holding the sheets against the mould surfaces.

One embodiment of the present invention and a method for its manufacture will now be described with reference to the accompanying drawings. The embodiment described is a centre board for a sailing boat.

In the drawings

Figure 1:
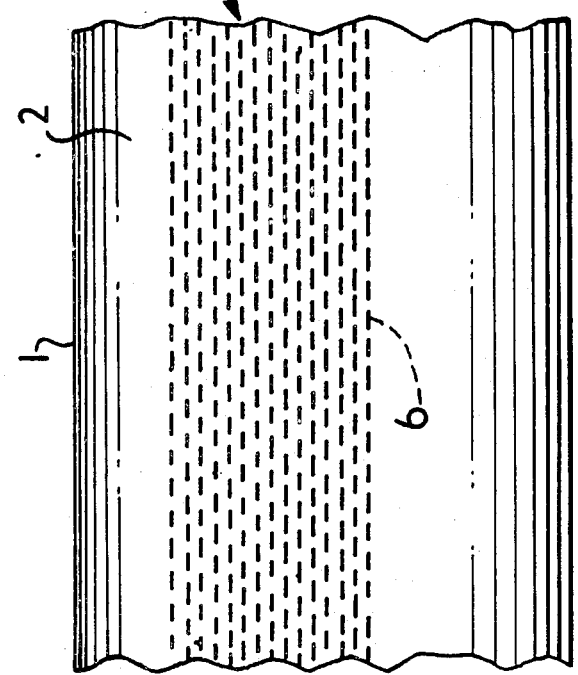
FIG. 1 is a plan view of a portion of one surface of a centre-board for a sailing boat showing the location of the reinforcement.
Figure 2:
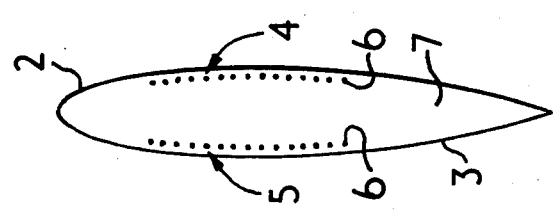
FIG. 2 is a cross-section through the centre-board.

Referring to FIGS. 1 and 2, the centre-board 1 has an aerofoil section of constant thickness over its length and comprises two smooth polyurethane surfaces 2 and 3 in which surfaces are located two arrays of high tensile steel wires 4 and 5 at a distance of 0.06 inches below the outer surface. Each array comprises 15 wires 6 spaced at 0.25 inches pitch. The interior 7 of the centre-board comprises a foamed polyurethane material.

The centre-board of FIGS. 1 and 2 is designed to be capable of withstanding a bending moment of 1,600 lb. incs. without permanent bend, and to have an end deflection of less than 5 inches when loaded in a cantilever fashion with a load of 450 lbs. at 26.8 inches from the support. It is to have an aerofoil section to constant thickness along its length (39 inches), the thickness to be greater than 1.2 inches over a distance of 3.5 inches at right angles to the length and the wire reinforcement to be located at a depth of 0.06 inches below the surface. From these dimensions it is possible to calculate by known methods the cross-sectional area of reinforcement required to meet the strength and rigidity requirements.

For the manufacture of this centre-board the cross-sectional area of reinforcement to give the strength requirements is found to be 0.075 square inches; assuming the yield strength of the steel to be 220,000 and Young's Modulus 30,000,000 psi.

The bond strength between the reinforcing wire and the plastics foam is dependent upon the surface area of the wire, the degree of surface etching of the wire and the density and chemical composition of the foamed plastics material. Since these parameters are capable of being controlled the bond strength can be predicted. In the present example, the wire surface is etched by shot blasting and the plastics foam is produced by reacting Polyol type DRE138 and Isocyanate type DRC, both manufactured by Imperial Chemical Industries Limited of Great Britain, and incorporating a Freon blowing agent. The shot weight is controlled to give a foam density of 0.5.

From the above data it can be calculated that 15 strands 0.08 inches diameter wire having a cross-sectional area of 0.0754 square inches used as reinforcement on each side of the centre-board about the region of maximum thickness will provide a bond which will not fail before the required bending stress is reached. The wire used has a yield strength of 250,000 psi and a wire surface to foam bond strength of 10,000 psi per inch circumference is obtained when tested by clamping one end and applying a load to the free end.

Figure 4:
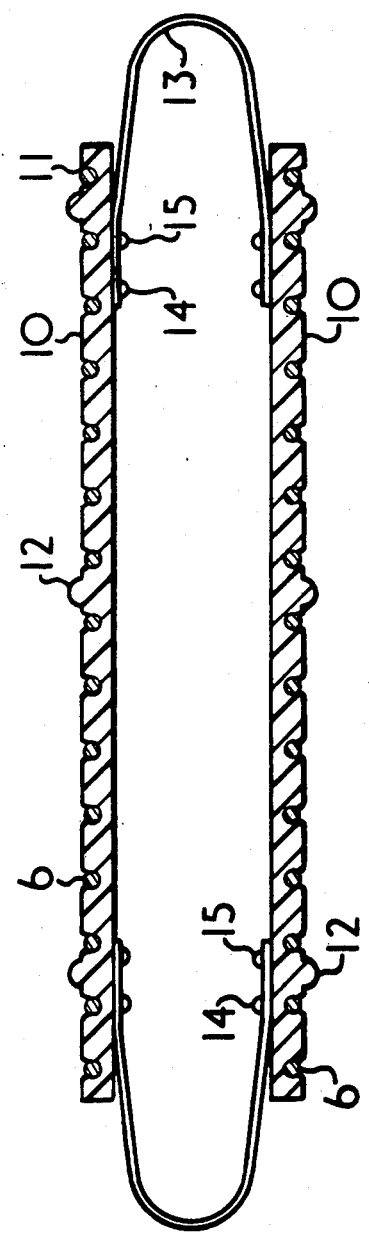
FIG. 4 is a cross-section across a double array of spaced reinforcing wires.

The method employed to locate the reinforcing wires to shown in FIG. 4. The fifteen straight reinforcing wires 6 are pre-assembled in plastic clip spacers 10 the wires being firmly held in individual clip-recesses 11 spaced at ¼ inch pitch. Seven such clip-spacers 10 being used in each array. The clips 10 have incorporated spacer lugs 12 (three per clip) which determine the distance of the wires from the inner walls of the mould. Two arrays of wires thus formed are joined together by U-shaped spring steel strips 13 which are located on lugs 14 and 15 formed on the clip spacers 10. Three U-shaped strips 12 are used at each end located on the second, fourth and sixth clip-spacers 10. The distance apart of the extremities of the arms of the U-shaped strips 13 is such that the distance between the arrays of wires is greater than that of the finished component.

The reinforcement assembly is placed in a mould which when closed compresses the U-spring 12 and locates the arrays of reinforcing wires at the required distance from the inner walls of the mould. The polyurethane, hardner and blowing agent are introduced into the closed mould in the conventional manner and the finished centre-board removed when curing is complete.

Figure 3:
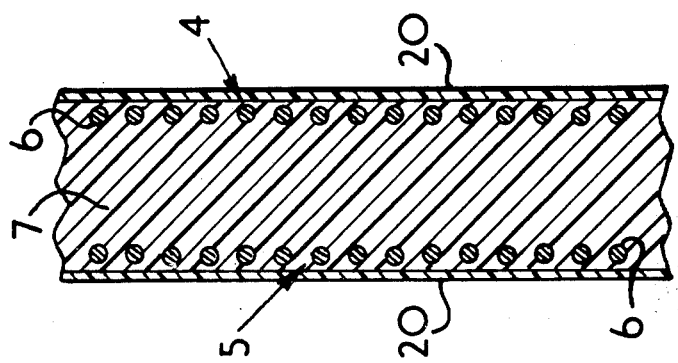
FIG. 3 is a section of a "skinned" component.

FIG. 3 shows a section of centre-board in which the outer skin 20 is formed from sheets of preformed plastics material, which are placed in the mould between the mould walls and the arrays of reinforcing wires before the mould is closed. The inner surface of the sheets is pre-treated to ensure adherence of the foamed polyurethane. Generation of the foam in the mould provides sufficient pressure to press the sheets against the inner walls of the mould and a "skinned" structure is obtained.

If desired the wire reinforcements may be attached directly to the plastics sheets thus dispensing with the use of the U-shaped clips. As previously indicated the wires may be bonded directly to the plastics sheets thus obviating the need to use clip-spacers.

I claim:

1. A plastics structure comprising a core of a foamed plastics material having two opposite surface, wherein there is contained in a surface layer of said foamed plastics material at least one array of parallel spaced high tensile steel reinforcing elements having a diameter of from about 0.040 to about 0.125 inches and a yield strength of not less than 200,000 psi to which the foamed plastics material adheres, said wires located at not less than 0.06 inches below the surface layers the said surface layer having a smooth outer surface and the high tensile steel reinforcing elements being aligned substantially parallel to the said outer surface.

2. A structure according to claim 1 wherein the high tensile steel elements are surface etched.

3. A structure according to claim 2 wherein the high tensile steel elements are surface etched by shot-blasting.

4. A structure according to claim 2 wherein the high tensile steel elements are surface etched by chemical treatment.

5. A structure according to claim 1 wherein the high tensile steel reinforcing elements are contained in each of the opposite surface layers.

6. A structure according to claim 5 containing additional layers of reinforcing elements in planes parallel to the layer of reinforcing elements in the surface layer thereof.

7. A structure according to claim 6 wherein the high tensile steel elements in the additional reinforcing layers are disposed at an angle to the elements in the surface layer thereof.

8. A structure according to claim 1 wherein the foamed plastics material is a foamed polyurethane.

9. A structure according to claim 1 wherein the structure is the centre board for a sailing dingy.

10. A plastics structure comprising a core of a foamed plastics material, and two opposite smooth outer surfaces, wherein there is contained, in a surface layer of said foamed plastics material at least one array of parallel spaced high tensile steel wires having a diameter of from about 0.040 to about 0.125 inches and a yield strength of not less than 200,000 psi to which the foamed plastic material adheres and located at not less than 0.06 inches below the outer surfaces, said outer surface comprising a skin of preformed, solidified, plastics material adheres.

11. A structure according to claim 10 wherein the skin and foamed plastics material are the same.

* * * * *